US008463253B2

(12) United States Patent
Chipalkatti et al.

(10) Patent No.: US 8,463,253 B2
(45) Date of Patent: Jun. 11, 2013

(54) FLEXIBLE LIFESTYLE PORTABLE COMMUNICATIONS DEVICE

(75) Inventors: Renu Chipalkatti, Lexington, MA (US); Jeffey M. Getchius, Cambridge, MA (US); Willis D. Stinson, III, Sherborn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1300 days.

(21) Appl. No.: 11/766,383

(22) Filed: Jun. 21, 2007

(65) Prior Publication Data

US 2008/0318616 A1    Dec. 25, 2008

(51) Int. Cl.
*H04M 3/00* (2006.01)
*H04M 3/42* (2006.01)
*H04M 11/00* (2006.01)
*H04B 1/38* (2006.01)
*G06F 1/24* (2006.01)
*G06F 3/00* (2006.01)

(52) U.S. Cl.
USPC ........ 455/418; 455/414.1; 455/406; 455/563; 713/100; 715/745

(58) Field of Classification Search
USPC ........... 455/406, 435.1, 461, 563, 550, 414.1, 455/418; 379/142.04; 713/100; 715/745
See application file for complete search history.

(56) References Cited

U.S. PATENT DOCUMENTS

| | | | |
|---|---|---|---|
| 6,212,408 B1* | 4/2001 | Son et al. ...................... | 455/563 |
| 2001/0011028 A1* | 8/2001 | Wendelrup .................... | 455/563 |
| 2002/0176579 A1* | 11/2002 | Deshpande et al. ........... | 380/270 |
| 2003/0114149 A1* | 6/2003 | Lehtonen et al. ............. | 455/418 |
| 2004/0203768 A1* | 10/2004 | Ylitalo et al. ............... | 455/435.1 |
| 2004/0259525 A1* | 12/2004 | Kotzin .......................... | 455/406 |
| 2005/0108329 A1* | 5/2005 | Weaver et al. ................ | 709/204 |
| 2005/0170854 A1* | 8/2005 | Benco et al. .................. | 455/461 |
| 2008/0080688 A1* | 4/2008 | Burgan et al. ............ | 379/142.04 |

* cited by examiner

*Primary Examiner* — Jinsong Hu
*Assistant Examiner* — Opiribo Georgewill

(57) ABSTRACT

A method may include receiving a call at a portable communication device, entering a first mode when the call is directed to a first device identifier associated with the portable communication device; and entering a second mode when the call is directed to a second device identifier associated with the portable communication device, wherein the first mode provides access to a first set of applications and a first set of user data and the second mode provides a second set of applications and a second set of user data.

25 Claims, 13 Drawing Sheets

MODE TABLE 563

| MODE NAME 602 | PHONE NO. 604 | APPLICATION 606 | APPLICATION DATA 608 | RING 610 | SKIN 612 | SHARE 614 |
|---|---|---|---|---|---|---|
| BUSINESS | 212-555-8000 | CONTACTS, DOCS, EMAIL | B_CONTACTS.DAT, B_DOCS.DAT, B_EMAIL.DAT | SOFT RING | BLUE | |
| PERSONAL | 201-891-7329 | CONTACTS, TETRIS, SMS, MMS, MUSIC, TV REMOTE | P_CONTACTS.DAT, HIGH_SCORE.DAT, SMS.DAT, MMS.DAT | LOUD SONG | GREEN | P_CONTACTS .DAT -> BUSINESS |

620 — BUSINESS row
622 — PERSONAL row

FIG. 6

STATE TABLE 564

| | LOCATION 702 | TIME 704 | DAY 706 | RECENT CALLS 708 | MODE 710 | PRIORITY 712 |
|---|---|---|---|---|---|---|
| 780 | HOME, CAR | | | | PERSONAL | 4 |
| 782 | OFFICE | | | | BUSINESS | 3 |
| 784 | BOSS, ASSISTANT | | | | BUSINESS | 1 |
| 786 | | T<8 A.M. OR T>5 P.M. | MONDAY THROUGH FRIDAY | | PERSONAL | 5 |
| 787 | | | SATURDAY OR SUNDAY | | PERSONAL | 6 |
| 788 | | 8 A.M.<T<5 P.M. | MONDAY THROUGH FRIDAY | | BUSINESS | 7 |
| 790 | | | | BOSS < 10 MIN. | BUSINESS | 2 |
| 792 | > HOME + 200 km | | | | BUSINESS | 8 |

FIG. 7

CALL TABLE 565

| | CALLER ID 802 | CALLER LOCATION 804 | CALLED ID 806 | CALLED LOCATION 808 | TIME 810 | DAY 812 | MODE 814 |
|---|---|---|---|---|---|---|---|
| 882 | BOSS | | ME | | | | BUSINESS |
| 884 | ASSISTANT | | ME | | | | BUSINESS |
| 886 | COLLEAGUE | | ME | | 8 A.M. < T < 5 P.M. | MONDAY THROUGH FRIDAY | BUSINESS |
| 888 | COLLEAGUE | | ME | | | SATURDAY OR SUNDAY | PERSONAL |
| 890 | ME | OFFICE | COLLEAGUE | HOME | | | PERSONAL |
| 892 | ME | OFFICE | COLLEAGUE | | | | BUSINESS |
| 894 | ME | | COLLEAGUE | HOME | | | PERSONAL |

FIG. 8

FLEXIBLE LIFESTYLE PORTABLE COMMUNICATIONS DEVICE

BACKGROUND INFORMATION

People often have different roles at different times of the day or in different places. For example, a person at work may be an employee. But when that person goes home, he or she may be a mother, father, etc. As a result, it is not uncommon for people to carry different portable communication devices, e.g., mobile phones, for different roles. For example, a person may carry a business mobile phone for work and a personal mobile phone for personal matters.

BRIEF DESCRIPTION OF THE DRAWINGS

FIG. 6 is a block diagram of an exemplary mode table;

FIG. 7 is a block diagram of an exemplary state table;

FIG. 8 is a block diagram of an exemplary call table;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments disclosed herein may provide for different modes of operation at different times for a portable communications device. Embodiments disclosed herein may allow for separate billing for services under different modes of operation, such as separate billing for business services and personal services. Embodiments disclosed herein may also allow for the itemization or tallying of services under different modes of operation in a single bill. Embodiments disclosed herein may also provide for a portable communications device that meets expectations of a user depending on the user's environment.

Figure 1:
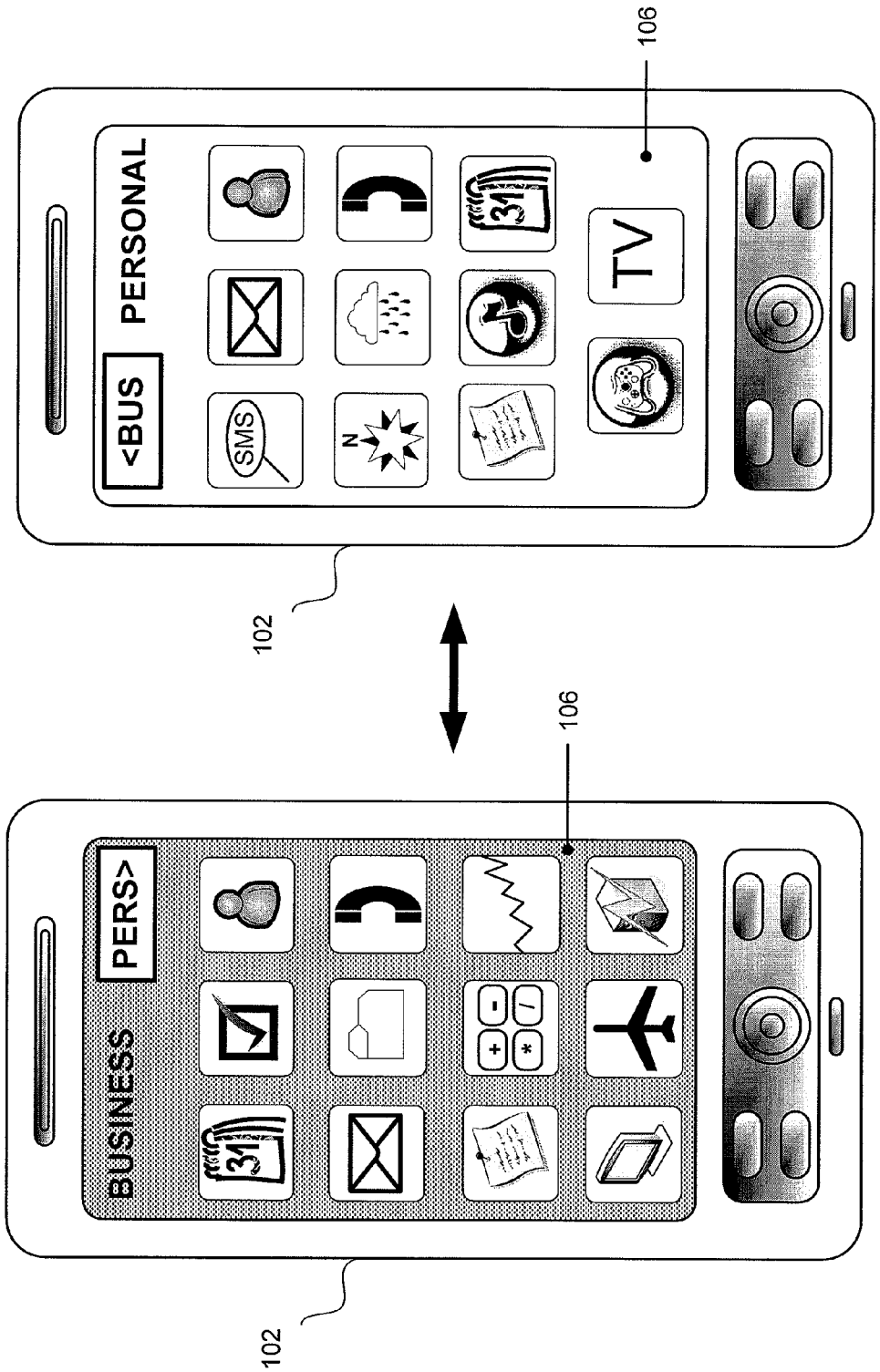
FIGS. 1A and 1B are diagrams of a personal communications device in one embodiment.

FIGS. 1A and 1B are diagrams of a personal communications device 102, e.g., a mobile phone, in one embodiment. In FIG. 1A, device 102 may be in a business operating mode as indicated by "BUSINESS" in the upper-left corner of a touch-screen display 106. In FIG. 1B, device 102 may be in a personal operating mode, as indicated by "PERSONAL" in the upper-right corner of display 106. The two different modes may be evident to the user by the background color or pattern of display 106. For example, in business mode, display 106 may be shaded as shown in FIG. 1A. In personal mode, display 106 may be white as shown in FIG. 1B. A user may switch from business mode to personal mode, for example, by touching the button on display 106 labeled "PERS>" in FIG. 1A. Likewise, a user may switch from personal mode (FIG. 1B) to business mode, for example, by touching the button on display 106 labeled "<BUS" in FIG. 1B.

When in business mode, device 102 may function as a business-tailored communication device. For example, device 102 may display business applications as shown in FIG. 1A, including (from top left to bottom right): a calendar, a task list, a corporate telephone directory, a corporate email service, business documents, a telephone dial pad, a note application, a calculator, a stock ticker, a connection to a desktop computer, business itinerary information, and a virtual private network (VPN) connection. Other applications are possible. The user may select an application by, for example, touching the application buttons on display 106.

When in personal mode, device 202 may function as a personal communications device. For example, device 102 may display applications tailored to personal matters as shown in FIG. 1B, including (from top left to bottom right): a simple messaging system (SMS, e.g., text messaging), a personal email service, a personal directory, a map service, a weather service, a telephone dial pad, a personal note application, a music player, a calendar, a game, and a television (TV) remote control. Other applications are possible and some applications in personal mode may be the same as applications in business mode.

In addition to displaying different applications, the applications in business mode in FIG. 1A may access different application data. For example, the corporate email service may access work email and not personal email. The corporate directory may access corporate contacts. Likewise, the applications in personal mode in FIG. 1B may access different application data. For example, the personal email service may access personal email and not work email. The personal directory may access personal contacts instead of business contacts.

In one embodiment, for example, business mode in FIG. 1A may be associated with a different phone number than personal mode in FIG. 1B. When in business mode, phone calls and data services may be associated with a business phone number and a business account. In this embodiment, when in personal mode, phone calls and data services may be associated with a personal phone number and a personal account. As such, services provided in personal mode and business mode, for example, may be managed, operated, tallied, accounted for, and/or billed separately.

Figure 2:
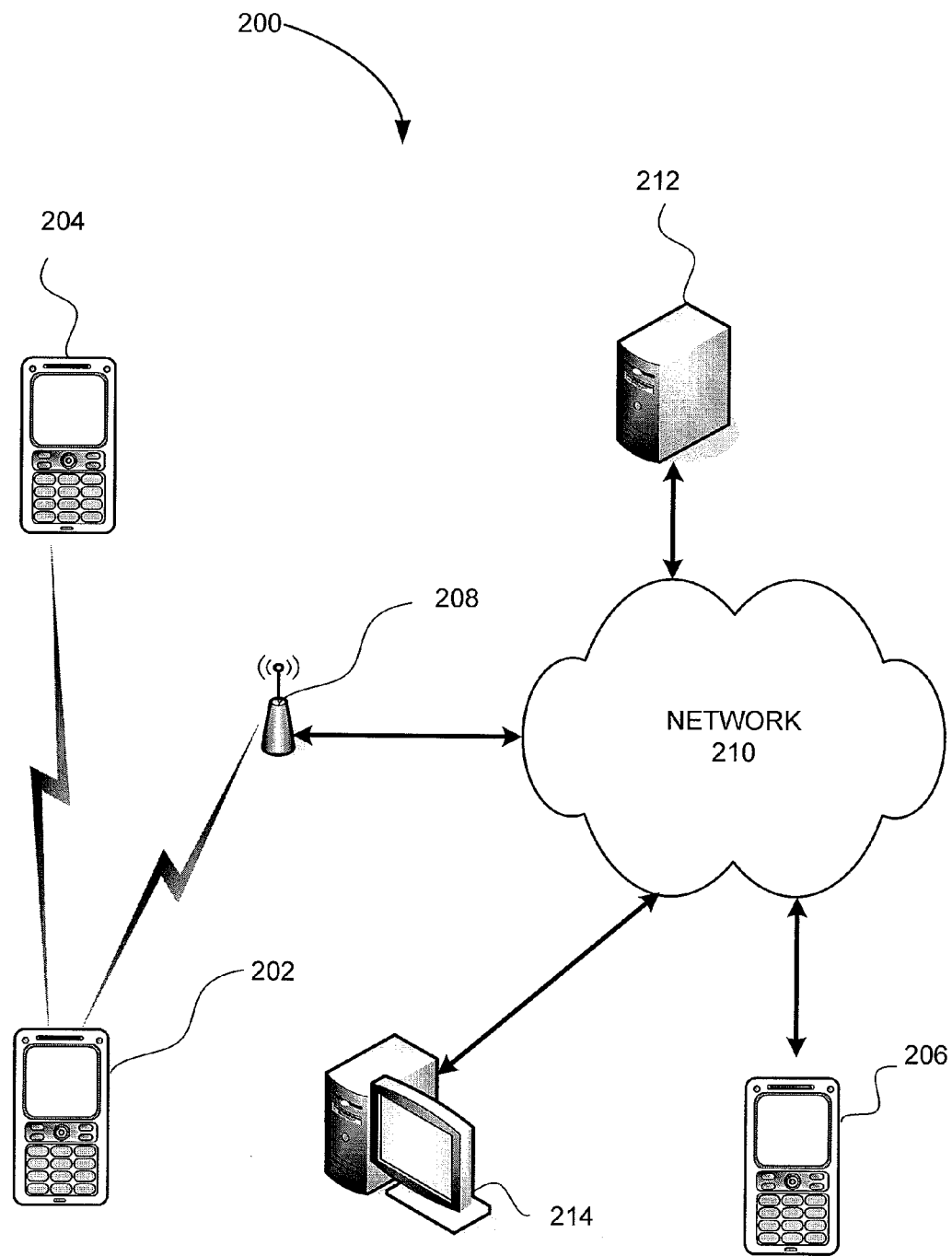
FIG. 2 shows an exemplary environment in which embodiments described herein may be implemented.

FIG. 2 shows an exemplary environment 200 in which embodiments described herein may be implemented. As shown, environment 200 may include personal communication devices 202, 204, and 206, a cell tower 208, a network 210, a server 212, and a home entertainment server 214. In other embodiments, environment 200 may include more, fewer, or different components. Moreover, one or more components of environment 200 may perform one or more functions described as being performed by another component of environment 200. Furthermore, one or more of devices 202, 204, and 206, tower 208, network 210, and server 212 may be remotely located from each other.

Device 202 may include, for example: a mobile telephone; a portable communications device; a personal computer (PC); a telephone, such as a radio telephone; a personal communications system (PCS) terminal that may combine cellular radiotelephone with data processing, facsimile, and/or data communications capabilities; an electronic notepad; a personal music player (PMP); a laptop; a personal digital assistant (PDA) that can include a radiotelephone, pager, Internet/intranet access, web browser, organizer, calendar, and a global positioning system (GPS); or another type of computation or communication device. Devices 102, 204, and 206 may include any of the device described above with respect to device 202 and may operate similarly to device 202.

As shown in FIG. 2, devices 202, 204, and 206, may communicate wirelessly with each other (such as device 202 communicating with device 204 using, for example, Bluetooth). Further, as shown in FIG. 2, devices 202, 204, and 206 may also communicate with other devices using a combination of wireless and wired networks (such as device 202 communicating with server 212 or with device 206).

Tower 208 may include a device for accessing network 210 that is able to receive and transmit wireless and/or wired signals, or any other device that provides access to a network. Tower 208 may communicate with device 202 using any wireless communication protocol. Devices 202, 204, and 206 may connect to network 210 via tower 208. In other embodiments, devices 202, 204, and 206 may connect to network 210 via wired connections. In yet other embodiments, devices 202, 204, and 206 may connect to network 210 directly or through a device other than tower 208. In one embodiment, tower 208 may include a wireless router that implements any IEEE 802 standard.

Network 210 may include the Internet, an ad hoc network, a local area network (LAN), a wide area network (WAN), a metropolitan area network (MAN), a cellular network, a public switched telephone network (PSTN), any other network, or combinations of networks.

Server 212 may include one or more computer systems for hosting server programs, database tables, and/or applications. Server 212 may track the use of network 210 by device 202, 204, or 206. In one embodiment, server 212 may provide tracking, accounting, managing, operating, itemizing, tallying, and/or billing services for devices 202, 204, and 206.

Home entertainment system 214 may include one or more computer systems for hosting programs, databases, and/or applications. System 214 may store media such as music, movies, and photos. System 214 may include a television monitor and/or a set-top box for displaying movies and photos. System 214 may include a LAN and/or a wireless LAN. System 214 may connect to network 210 via a coaxial cable or a fiber optic cable, for example. In one embodiment, system 214 is connected to network 210 using FiOS™.

Figure 3:
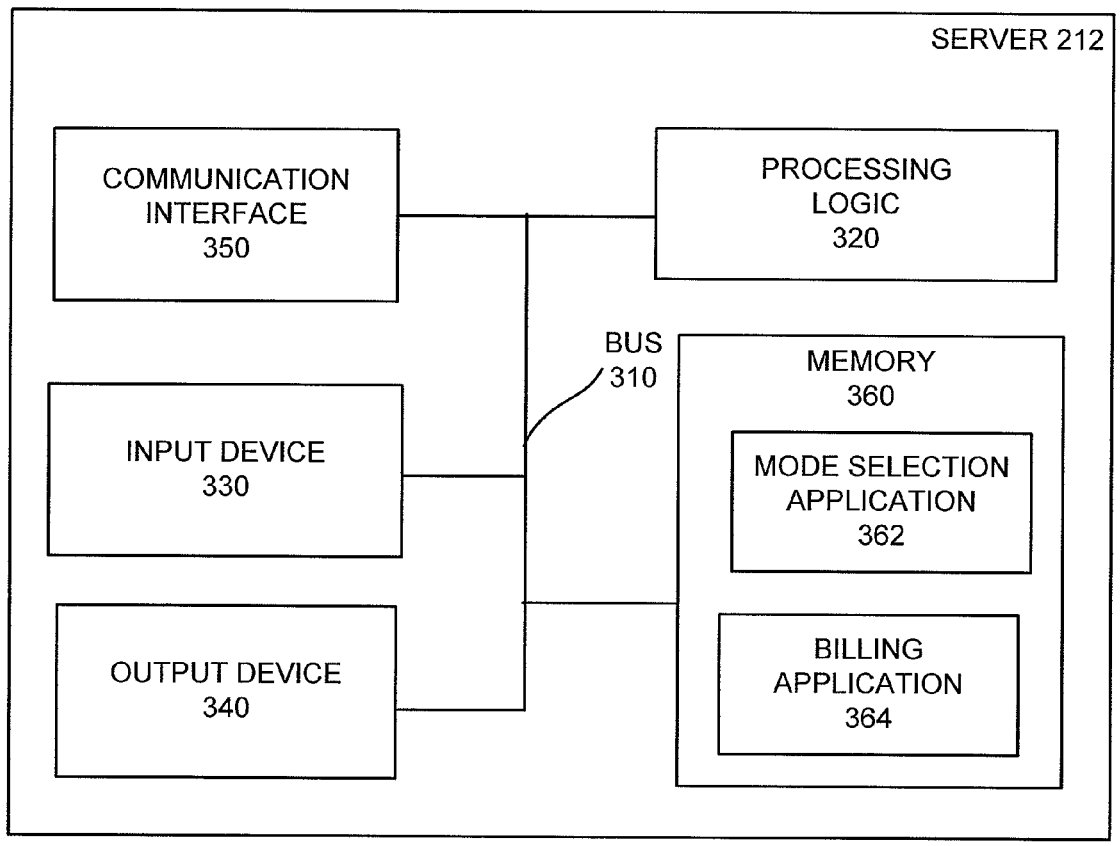
FIG. 3 is a block diagram of exemplary components of a server.

FIG. 3 is a block diagram of exemplary components of server 212. System 214 may be configured in a similar fashion as server 212. Server 212 may include a bus 310, processing logic 320, an input device 330, an output device 340, a communication interface 350, and a memory 360. Memory 360 may include a mode selection application 362 and an operating application 364. Mode selection application 362 and operating application 364 are described in more detail below with respect to FIGS. 9 and 10. Server 212 may include other components (not shown) that aid in receiving, transmitting, and/or processing data. Moreover, other configurations of components in server 212 are possible. Further, one or more components of server 212 may be remotely located from each other.

Bus 310 may include a path that permits communication among the components of server 212. Processing logic 320 may include any type of processor or microprocessor (or groups of processors or microprocessors) that interprets and executes instructions. In other embodiments, processing logic 320 may include an application-specific integrated circuit ("ASIC"), a field-programmable gate array ("FPGA"), or the like.

Input device 330 may include a device that permits a user to input information into server 212, such as a keyboard, a keypad, a mouse, a pen, a microphone, one or more biometric mechanisms, or the like. Output device 340 may include a device that outputs information to the user, such as a display, a printer, a speaker, etc.

Communication interface 350 may include any transceiver-like mechanism that enables server 212 to communicate with other devices and/or systems. Memory 360 may include a random access memory ("RAM") or another type of dynamic storage device that may store information and instructions for execution by processing logic 320; a read-only memory ("ROM") device or another type of static storage device that may store static information and instructions for use by processing logic 320; and/or some other type of magnetic or optical recording medium and its corresponding drive, e.g., a hard disk drive ("HDD"), for storing information and/or instructions.

Memory 360 may include data structures or software programs to control operation of device 202 and its components. As mentioned above, memory 360 may store mode selection application 362 and operating application 364, for example. Mode selection application 362 may select the operating mode of device 202 as described below. Operating application 364 may manage and track activities performed by device 202 (such as phone calls, emails, etc.) during different operation modes. Operating application 364 may also bill the user accordingly. Memory 360 may store applications other than mode selection application 362 and operating application 364.

Server 212 may perform certain operations, as described in detail below. Server 212 may perform these operations in response to processing logic 320 executing software instructions contained in a computer-readable medium, such as memory 360. A computer-readable medium may be defined as a physical or logical memory device and/or carrier wave. The software instructions may be read into memory 360 from another computer-readable medium or from another device via communication interface 350. The software instructions contained in memory 360 may cause processing logic 320 to perform processes that are described below.

Figure 4:
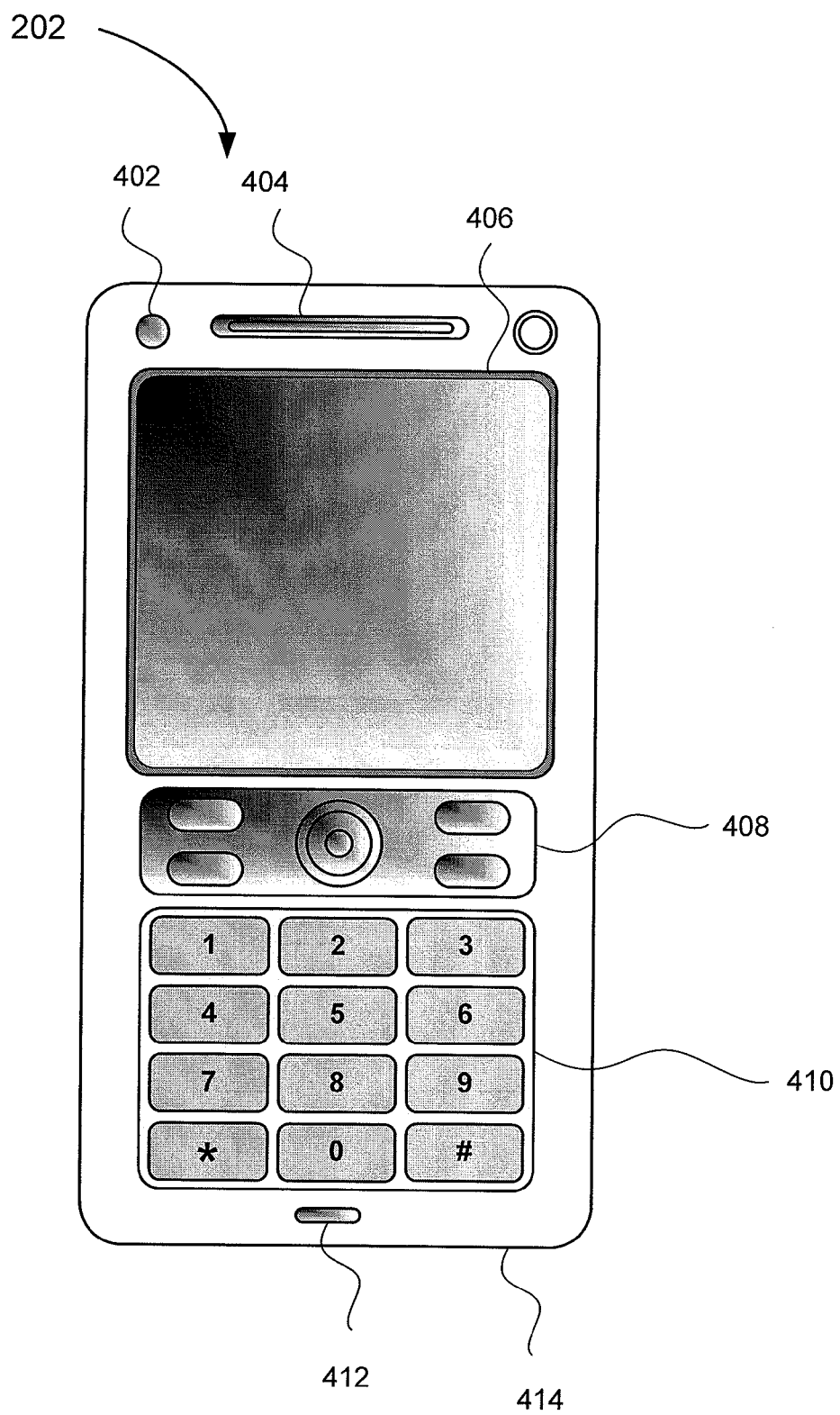
FIG. 4 is an exemplary diagram of a portable communications device.

FIG. 4 is an exemplary diagram of device 202. As illustrated, device 202 may include a camera 402, a speaker 404, a display 406, control buttons 408, a keypad 410, a microphone 412, and a housing 414. Device 202 may include other components (not shown in FIG. 4) that aid in receiving, transmitting, and/or processing data. Moreover, other configurations of components in device 202 are possible. Devices 102, 204, and 206 may include similar components as device 202 and may operate similarly.

Camera 402 may enable a user to view, capture and store media (e.g., images, video clips) of a subject in front of device 202. Speaker 404 may provide audible information to a user of device 202. Display 406 may include a display screen to provide visual information to the user, such as video images or pictures, and may include a touch screen to accept inputs from a user. For example, display 406 may provide information regarding incoming or outgoing telephone calls, games, telephone numbers, contact information, the current time, e-mail, etc.

Control buttons 408 may permit the user to interact with device 202 to cause device 202 to perform one or more operations, such as place or receive a telephone call. Keypad 410 may include a standard telephone keypad and may include additional keys to enable inputting (e.g., typing) information into device 202. Control buttons 408 and/or keypad 410 may be integrated into display 406 as a touch-screen display. Microphone 412 may receive audible information from the user. Housing 414 may provide a casing for components of device 202 and may protect the components from outside elements.

Figure 5:
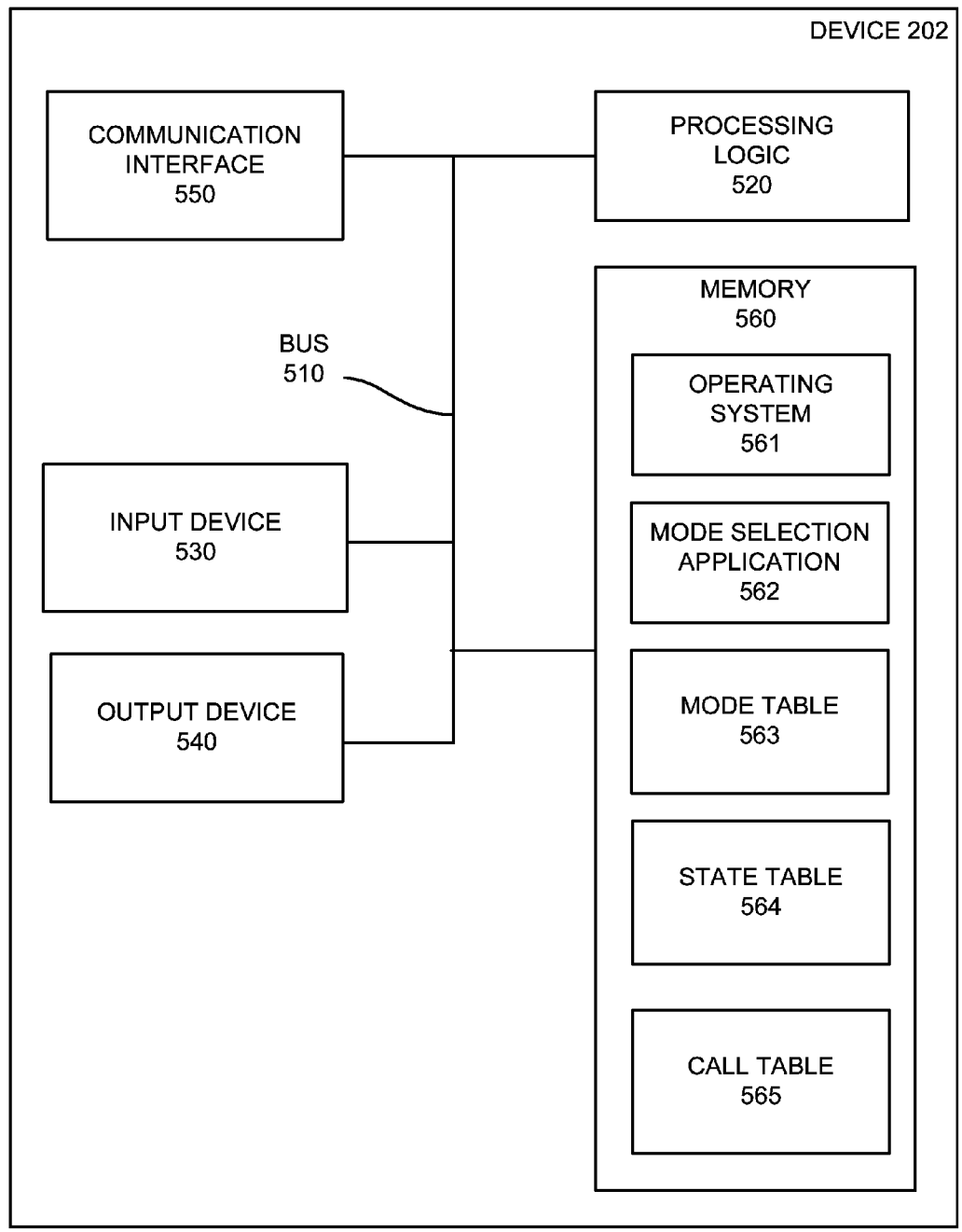
FIG. 5 is a diagram of exemplary components of a portable communications device.

FIG. 5 is a diagram of exemplary components of device 202 of FIG. 4. As shown in FIG. 5, device 202 may include a bus 510, processing logic 520, an input device 530, an output device 540, a communication interface 550, and memory 560. Memory 560 may include an operating system 561, a mode selection application 562, a mode table 563, a state table 564, and a call table 565. Mode table 563, state table 564, and call table 565 are described in more detail below with respect to FIGS. 6, 7, and 8, respectively. Mode selection application 562 is described in more detail below with respect to FIGS. 9 and 10. Device 202 may include other components (not shown in FIG. 5) that aid in receiving, transmitting, storing and/or processing data. Moreover, other configurations of components in device 202 are possible. Further, one or more components of device 202 may be remotely located from each other.

Bus 510 may include a path that permits communication among the components of device 202. Processing logic 520 may include a processor, microprocessor, an ASIC, an FPGA, or the like. Processing logic 520 may include a GPS unit that may employ temporal triangulation to determine location coordinates.

Input device 530 may include mechanisms for inputting information into device 202. Input device 530 may include, for example, microphone 412 to receive audio signals, keys 408 or 410 to permit data and control commands to be input, or camera 402, etc. Input device 530 may include a biometric reader, such as a finger print reader or iris scanner. Output device 540 may include one or more devices for outputting information from device 202. Output device 540 may include, for example, speaker 504 to output audio signals, display 506 to output visual information, a vibrator (not shown) to alert a user, or any other type of component to convey information to a user.

Input device 530 and output device 540 may allow the user of device 202 to receive a menu of options. The menu may allow the user to select various functions or modes associated with applications executed by device 202. Input device 530 and output device 540 may allow the user to activate a particular mode or application, such as a mode defined by an application running in device 202.

Communication interface 550 may include, for example, a universal serial bus (USB) port for communications over a cable. Communication interface 550 may include a transmitter that may convert baseband signals from processing logic 520 to radio frequency (RF) signals and/or a receiver that may convert RF signals to baseband signals. Alternatively, communication interface 550 may include a transceiver to perform functions of both a transmitter and a receiver.

Communication interface 550 may include one or more antennas (not shown) for transmission and reception of the RF signals. For example, communications interface 550 may include an antenna for communicating with tower 208 and an antenna for communicating with satellites (not shown) for the GPS unit. Communication interface 550 may include a USB serial port. Communications interface 550 may include an IEEE 802 compliant transceiver. Communication interface 550 may include a Bluetooth unit that may incorporate the Bluetooth standard. Communication interface 550 may send and receive signals, such as Bluetooth signals and/or electromagnetic signals, to other devices, e.g., device 204 or 206, within a vicinity of the device 202, such as within 10, 20, or 30 meters, for example.

Memory 560 may include a HDD, a RAM, a ROM, flash memory, a removable memory, and/or another type of memory to store data and/or instructions that may be used by processing logic 520 (e.g., any type of a computer-readable medium). Memory 560 may include data structures or software programs to control operation of device 202 and its components. As mentioned above, memory 560 may store operating system 561, a mode selection application 562, a mode table 563, a state table 564, and a call table 565.

Operating system 561 may provide a software platform on top of which application programs, such as mode selection application 562, can run. Mode selection application 562 may allow device 202 to switch between different modes of operation. Mode table 563 may provide the features and options, for example, for each operating mode of device 202. State table 564 may describe conditions that device 202 may use for determining in which mode to operate. A call table 565 may describe received and/or placed phone calls that device 202 may use for determining in which mode to operate. Mode table 563, state table 564, and call table 565 are described below with respect to FIGS. 6, 7, and 8, respectively. Memory 560 may include other application programs not shown in FIG. 5.

FIG. 6 is a block diagram of exemplary mode table 563. Mode table 563 may identify a group of modes, where each mode may provide features and options, e.g., rules, that device 202 may offer to its user. Mode table 563 may be stored in memory 360 of server 212 as well as or instead of in device 202. Mode table 563 may include a mode name field 602, a phone number field 604, an application field 606, an application data field 608, a ring field 610, a skin field 612, and a share field 614.

Mode name field 602 may identify an operational mode of device 202. For example, FIG. 6 illustrates two modes: BUSINESS mode 620 and PERSONAL mode 622. More than two modes are possible. In one embodiment, there may be multiple business modes and/or multiple personal modes. For example, there may be a personal mode for when at home and a personal mode for when away from home. In addition, there may be different modes for different users, e.g., different members of a family may share device 202 and each user may have multiple modes.

Phone number field 604 may identify a phone number associated with device 202 when device 202 operates in the corresponding mode, e.g., the phone number via which device 202 may place or receive a call when device 202 is in the corresponding mode. In one embodiment, a Session Initiation Protocol (SIP) universal resource indicator (URI) may be used instead of a phone number. As used herein, a "phone number," "caller identifier," "calling identifier," or "device identifier" may include a phone number, a SIP URI, etc. BUSINESS mode 620 may have a corresponding phone number, e.g., caller identification, of 212-555-8000 in phone number field 604. In one embodiment, when a user of device 202 places a phone call when in BUSINESS mode 620, the phone call may be placed using 212-555-8000. PERSONAL mode 622 may have, for example, a corresponding phone number of 201-891-7329 in phone number field 604. In one embodiment, when a user of device 202 places a phone call when in PERSONAL mode 622, the phone call may be placed using 201-891-7329.

Application field 606 may identify the applications that device 202 may access when in the corresponding mode identified in mode name field 602. In the exemplary embodiment of FIG. 6, BUSINESS mode 620 includes in application field 606: an address book (e.g., CONTACTS), a document management application (e.g., DOCS), and an email application (e.g., EMAIL). PERSONAL mode 622 includes in application field 606: an address book (e.g., CONTACTS), a Tetris game (e.g., TETRIS), text messaging (e.g., SMS), multimedia messaging (e.g., MMS), a music player (e.g., MUSIC), and a TV remote control application (e.g., TV REMOTE).

Applications other than what is listed in application field 606 are possible. For example, other applications may include business voice mail, PBX applications, other enterprise applications, personal voice mail, personal email, and video and music streaming.

In one embodiment, when in BUSINESS mode 620, only applications listed in corresponding field 606 are displayed on display 406 for the user to access. In this embodiment, for example, games would not be accessible without first switching to PERSONAL mode 622. In this embodiment, when in PERSONAL mode 622, only applications listed in corresponding field 606 are displayed on display 406 for the user to access. Business documents, for example, would not be accessible without first switching to BUSINESS mode 620.

Application data field 608 may describe the application data corresponding to the applications identified in application field 606. In the exemplary embodiment of FIG. 6, when accessing the address book in BUSINESS mode 620, the address book may use the application data identified in application data field 608, e.g., B_CONTACTS.DAT. Likewise, when accessing the document management application (e.g., DOCS), the application may use B_DOCS.DAT for data. When accessing the email application (e.g., EMAIL) in BUSINESS mode 620, the email application may use the application data in B_EMAIL.DAT.

When accessing the address book in PERSONAL mode 622, the address book may use P_CONTACTS.DAT for data. Likewise, when accessing the Tetris game, (e.g., TETRIS), the application may use HIGH_SCORE.DAT for data. When accessing the SMS application (e.g., SMS), the SMS application may use the data in SMS.DAT. Further, when accessing the MMS application, the MMS application may use the data in MMS.DAT.

Ring field 610 may include the ring tone corresponding to the mode identified in mode name field 602. In the exemplary embodiment of FIG. 6, when receiving a call in BUSINESS mode 620, device 202 may ring softly (e.g., SOFT RING) as defined in ring field 610. When receiving a call in PERSONAL mode 622, device 202 may play a loud song (e.g., LOUD SONG) as defined in ring field 610. Ring field 610 may define more complicated types of rings, such as identifying an audio media file with a ring tone, for example.

Skin field 612 may identify the skin, e.g., the look, of the corresponding mode identified in mode name field 602. In the exemplary embodiment of FIG. 6, when in BUSINESS mode 620, device 202 may have a blue skin (e.g., BLUE) as defined in skin field 612. When in PERSONAL mode 622, device 202 may have a green skin (e.g., GREEN) as defined in skin field 612. The user of device 202 may easily be able to distinguish the mode of device 202 by looking at display 406. More complicated skin types may be available that define characteristics other than color, such as window border size, button size, text size, etc.

Share field 614 may indicate rules for sharing data from one mode to other modes. In the exemplary embodiment of FIG. 6, personal contacts (e.g., P_CONTACTS.DAT) may be available from BUSINESS mode 620, but business contact (e.g., B_CONTACTS.DAT) may not be available from PERSONAL mode 622 as defined in share field 614. BUSINESS mode 620 may not allow any sharing of data to other modes, e.g., share field 614 is empty. Other more complicated sharing rules are possible.

As mentioned above, mode table 563 may include additional, different, or fewer fields than illustrated in FIG. 6. For example, mode table 563 may include a field for an email address, a universal resource indicator (URI), or a web page corresponding to the mode identified in mode name field 602. Mode table 563 may include a vibrate field that defines different sequences of vibrations associated with different modes.

Some fields in mode table 563 may be configured by a user of device 202. For example, the user could select the skin identified in skin field 612 or the ring identified in ring field 610. Other fields, may be set by a network administrator, such as, for example, the phone number identified in phone number field 604, the applications identified in application field 606, the name of the mode identified in mode name field 602, and/or the definitions is share field 614.

FIG. 7 is a block diagram of exemplary state table 564. State table 564 may identify groups of conditions, e.g., rules, that may influence the current mode of device 202. State table 564 may be stored in memory 360 of server 212 as well as or instead of in device 202. State table 564 may include a location field 702, a time field 704, a day field 706, a recent calls field 708, a mode field 710, and a priority field 712. As discussed below, call table 564 may include additional, different, or fewer fields than illustrated in FIG. 7. When the current state of device 202 matches the conditions in a rule, e.g., fields 702 through 708, for example, then device 202 may change to the mode in the corresponding mode field 710.

Location field 705 may identify a location condition that may influence the current mode of device 202. For example, location field 705 may include OFFICE, HOME, CAR, etc. Time field 704 and day field 706 may indicate a time of day and day of week that may influence the current mode. Recent calls field 708 may indicate placed or received calls that may influence the current mode. Mode field 710 may be the mode determined by the corresponding conditions to which device 202 may switch. Priority field 712 may include the priority of the rule should the rules provide conflicting modes.

In the exemplary embodiment of FIG. 7, as defined by rule 780, when the state of device 202 is such that its location is HOME or CAR, then device 202 may enter PERSONAL mode 622. As defined by rule 782, when the state of device 202 is such that its location is OFFICE, then device 202 may enter BUSINESS mode 620. As defined by rule 784, when the state of device 202 is such that its location is BOSS or ASSISTANT, e.g., device 202 is in the vicinity of device 202's user's boss or assistant, then device 202 may enter BUSINESS mode 620.

As defined by rules 786 and 787, when the state of device 202 is such that the current time of day is before 8 a.m. or after 5 p.m. on a Monday through Friday, or any time on Saturday or Sunday, then device 202 may enter PERSONAL mode 622. As defined by rule 788, when the state of device 202 is such that the current time of day is after 8 a.m. and before 5 p.m., Monday through Friday, then device 202 may enter BUSINESS mode 620.

As defined by rule 790, when the state of device 202 is such that BOSS appears in the recent call list within the previous 10 minutes, then device 202 may enter BUSINESS mode 620. As shown in rule 792, if user device 202 is greater than 100 km from home, then device 202 may enter BUSINESS mode 620—as the user is likely traveling on business.

Some fields in state table 564 may be configured by the user of device 202. For example, the user could select the times of day device 202 may enter PERSONAL mode 622 or BUSINESS mode 620. Other fields may be set by a network administrator, such as, for example, the locations where device 202 may be in BUSINESS mode 620.

As mentioned above, state table 564 may include additional fields. For example, additional fields could include a temperature field, a light condition field, a words field, a recent email field, a recent SMS field, and/or a biometric field. A temperature field may indicate a temperature around user device 202 that may influence the current mode. In this example, a thermometer in device 202 may measure the current temperature. A light condition field may indicate light conditions (inside, outside, bright, dark, dusk) that may influence the current mode. In this example, camera 402 could monitor the current light conditions. A words field may indicate the words used in phone calls, recent text messages, and/or emails that may influence the current mode. Processing logic 520 may scan recent emails, text messages, and/or phone calls (using voice recognition technology) to determine current words the user of device 202 is using. The biometric device of input device 530 may read the biometric characteristics of its user and compare these results to the biometric field. In this embodiment, different users (such as different family members) may be assigned different modes.

FIG. 8 is a block diagram of exemplary call table 565. Call table 565 may identify telephone numbers, call times, etc. that may influence the current mode of device 202. Call table 565 may be stored in memory 360 of server 212 as well as or instead of in device 202. Call table 565 may include a caller ID field 802, a caller location field 804, a called ID field 806, a called location field 808, a time field 810, a day field 812, and a mode field 814. As discussed below, additional, different, or fewer fields other than those shown in FIG. 8 are possible. When device 202 receives or places a call that matches the conditions in a rule, e.g., fields 802 through 812, for example, then device 202 may change to the mode in the corresponding mode field 814.

Caller ID field 802 may indicate a caller identification (e.g., phone number or contact name) from which a phone call was placed that may influence the current mode. In one embodiment, caller ID field 802 may be populated from phone numbers in a business contact list and/or a personal contact list. Caller location field 804 may indicate the caller's location (e.g., HOME, OFFICE, or CAR) that may influence the current mode. Called ID field 806 may indicate a caller identification (e.g., phone number or contact name) to which a phone call was placed that may influence the current mode. Called location 808 may indicate a location (e.g., HOME, OFFICE, or CAR) associated with the called ID field 806. Time field 810 and day field 812 may indicate the time of day and day of the week that may influence the current mode. Mode field 814 may indicate the mode determined by the corresponding conditions set forth in the fields 802 to 812.

As shown in the exemplary embodiment of FIG. 8, rule 882 indicates that whenever the boss (e.g., BOSS) calls the user of device 202 (e.g., ME, personal or business number), then device 202 may be in BUSINESS mode 620. As shown with rule 884, whenever the assistant (e.g., ASSISTANT) calls the user (e.g., ME), then device 202 may be in BUSINESS mode 620. As shown in rule 886, when the user's colleague (e.g., COLLEAGUE) calls the user from Monday through Friday during business hours, then device 202 may be in BUSINESS mode 620. As shown in rule 888, however, when the user's colleague (e.g., COLLEAGUE) calls on Saturday or Sunday, then user device 202 may be in PERSONAL mode 622.

As shown in rule 890, when the user calls HOME from the OFFICE, then user device 202 may be in PERSONAL mode 622. As shown in rule 892, when the user (e.g., ME) calls COLLEAGUE from the OFFICE, then user device 202 may be in BUSINESS mode 620. As shown in rule 894, when the user (e.g., ME) calls COLLEAGUE from HOME, then user device 202 may be in PERSONAL mode 622.

In the embodiment where caller ID field 802 is populated from phone numbers in a business contact list and/or a personal contact list, then phone numbers from the personal contact list may be associated with PERSONAL mode 622. Phone numbers from the business contact list may be associated with BUSINESS mode 620. In another embodiment, call table 565 may include a rule such that calls to the caller ID 212-555-8000 (e.g., the number associated with BUSINESS mode 620 in mode table 563) may cause device 202 to enter BUSINESS mode 620. Call table 565 may include a rule such that calls to the caller ID 201-891-7329 (e.g., the number associated with PERSONAL mode 622 in mode table 563) may cause device 202 to enter PERSONAL mode 622.

Some rules and fields in call table 565 may be configured by the user of device 202. For example, the user could set call table 565 such that all calls to the OFFICE may be in BUSINESS mode 620. Other rules and fields may be set by a network administrator, such as, for example, setting all calls from the OFFICE to HOME such that the device 202 may be in PERSONAL mode 622.

As mentioned above, fields other than those shown in FIG. 8 are possible. For example, call table 565 may include an in/outgoing field. An in/outgoing field may indicate whether a call is received by device 202 or place by device 202, which may affect the current mode of device 202.

Call table 565 may also be considered a type of "state" table, similar to state table 564, that is consulted when the state of device 202 includes a call being received or placed.

Figure 9:
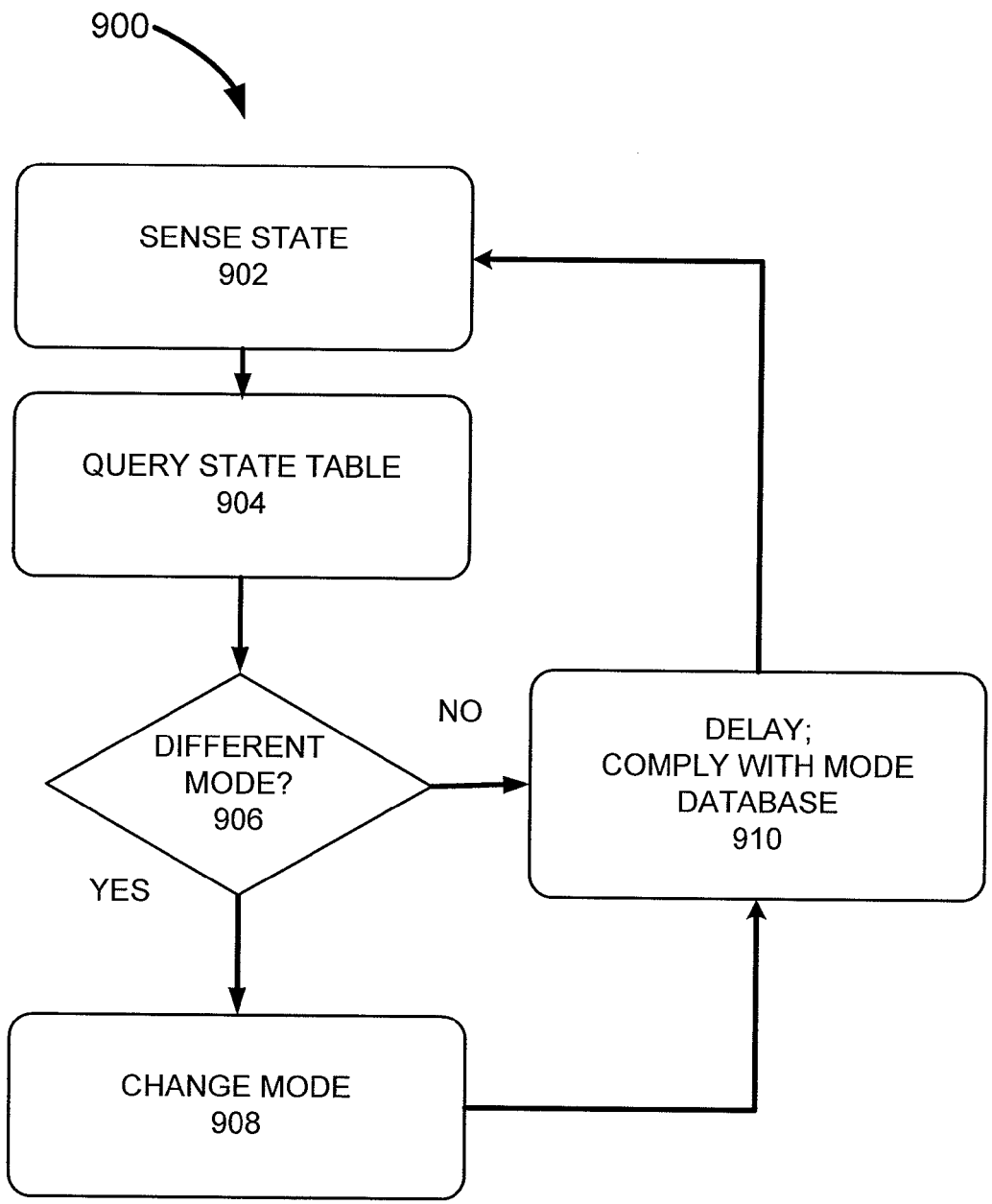
FIG. 9 is a flow chart of an exemplary process for changing a mode based on a sensed state of a device.

FIG. 9 is a flow chart of an exemplary process 900 for changing mode based on a sensed state of device 202. Process 900 may be performed in device 202 by processing logic 520 running mode selection application 562, for example, stored in memory 560. In another embodiment, process 900 may be performed in server 212 by processing logic 320 running application 362, for example, stored in memory 360. Alternatively, process 900 may be performed by both device 202 and server 212 in parallel or in a distributed manner.

The current state of device 202 may be sensed (block 902). For example, the current location of device 202 may be sensed. The current location of device 202 may be determined using the GPS unit or the Bluetooth unit. The Bluetooth unit may determine that device 202 is in the user's car when, for example, device 202 pairs with the user's car stereo. The Bluetooth unit may detect the presence of the boss's or assistant's mobile phone, for example, and determine its location as BOSS or ASSISTANT. Alternatively, the current location of device 202 may be determined, for example, using camera 402. Using facial recognition technology, when camera 402 recognizes the user's boss or assistant, device 202 may consider itself in location BOSS or ASSISTANT. Alternatively, server 212 may send location information to device 202 based on information about tower 208. Current time and day information may be determined by a clock in processing logic 510 or by server 212. Current recent call information may be determined, for example, by accessing recent call information stored in memory 560.

State table 564 may be queried (block 904). Device 202 or server 212 may compare the current state information to rules in state table 564. If state table 564 identifies a mode different than the current mode (block 906: YES), then the current mode may be changed. When state table 564 creates a conflict, then the rule with the higher priority overrules the rule with the lower priority. For example, rule 784 may at times conflict with rule 780. In this case, rule 784 would overrule rule 780 because rule 784 may have, for example, a higher priority as defined by priority field 712. Thus, if the user of device 202 is entertaining the boss at her home, then device 202 may determine that the current location is both BOSS and HOME. Applying rule 780 may result in PERSONAL mode 622. Applying rule 784 may result in BUSINESS mode 620. This conflict may be resolved using priority field 712, which may result in BUSINESS mode 620 being selected.

Returning to FIG. 9, block 908, the mode may change, for example, from PERSONAL mode 622 to BUSINESS mode 620 or from BUSINESS mode 620 to PERSONAL mode 622. If process 900 is performed by server 212, then server 212 may send an instruction to device 202 to change modes. If process 900 is performed by device 202, then device 202 may send an indication to server 212 of the change of mode. In one embodiment, the user of device 202 may be prompted before device 202 changes mode. If state table 564 identifies a mode that is the same as the current mode (block 906: NO), then the current mode may not be changed.

A delay may occur (block 910) before sensing the current state of device 202 again and repeating process 900. During the delay (block 910), device 202 may allow the user to use device 202 as defined in mode table 563. For example, in PERSONAL mode 622, the user may have access to the applications defined in application field 606 of rule 622. In BUSINESS mode 620, the user may have access to the applications defined in application field 606 of rule 620. Server 212 may manage and track activities in different modes. Activities performed by the user in PERSONAL mode 622 may have different billing attributes than activities performed by the user in BUSINESS mode 620. For example, activities performed by the user in PERSONAL mode 622 may be accounted for apart from BUSINESS mode 620 activities and may be billed to the user's home address. Likewise, activities performed by the user in BUSINESS mode 620 may accounted for apart from activities in PERSONAL mode 622 and may be billed to the user's business address. In one embodiment, activities performed by the user in PERSONAL mode 622 and BUSINESS mode 620 may be billed together (e.g., on the same bill sent to the same address), but may be itemized and/or tallied separately. For example, a bill entry (e.g., activity entry) may have "personal" or "business" next to the entry. In another example, all the PERSONAL mode 622 entries could be listed and summed separately on the same bill from all the BUSINESS mode 620 entries.

Figure 10:
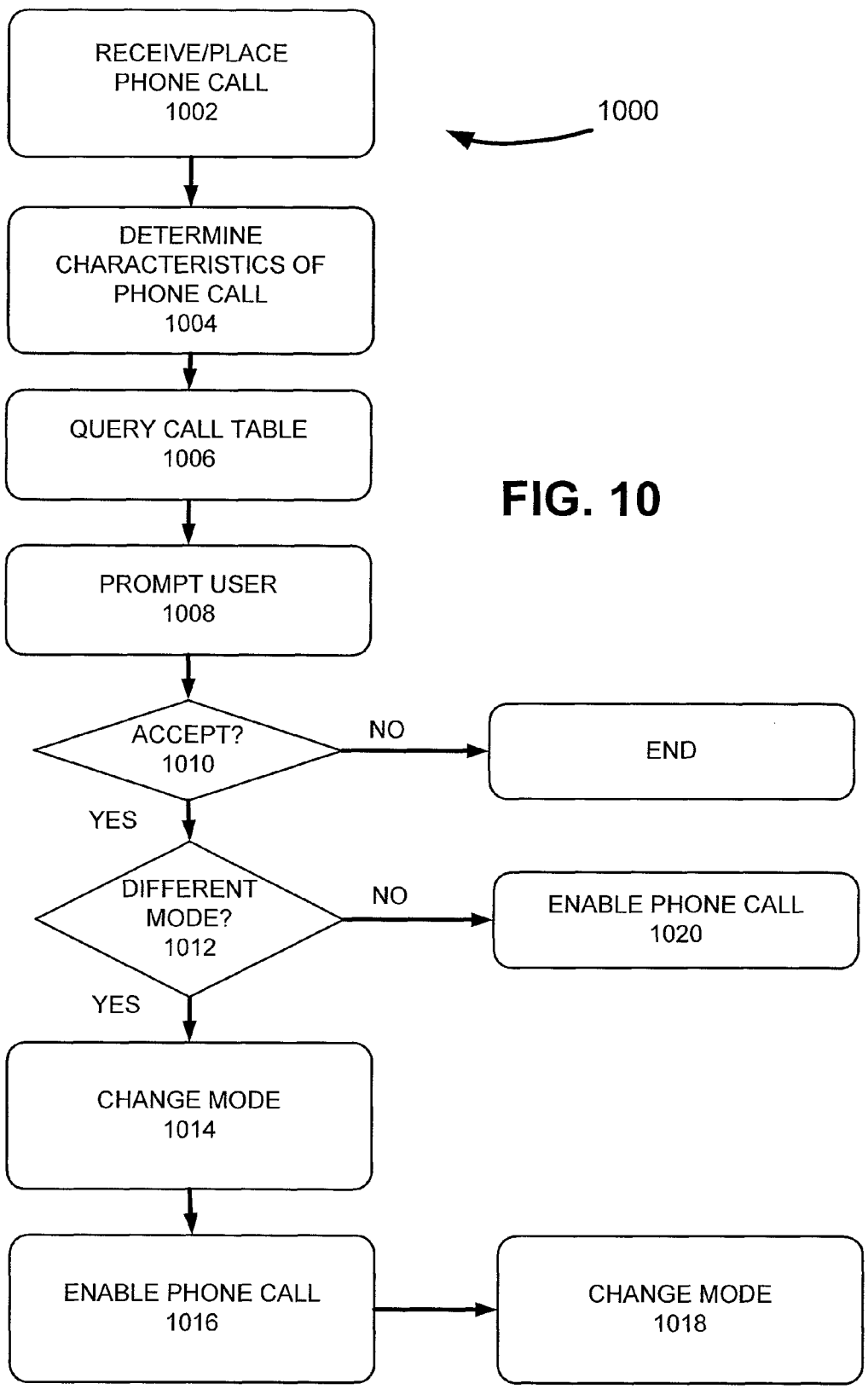
FIG. 10 is a flow chart of an exemplary process for changing a mode based on a received or placed phone call.

FIG. 10 is a flow chart of an exemplary process 1000 for changing mode based on a received or placed phone call. Process 1000 may be performed in device 202 by processing logic 520 running an application 562 for example, stored in memory 560. In another embodiment, some or all of process 1000 may be performed in server 212 by processing logic 320 running an application 362, for example, stored in memory 360.

Process 1000 may begin when a phone call is placed or a phone call is received (block 1002). For example, a user may place a phone call from device 202 or the user may receive a phone call on device 202. The characteristics of the phone call may be determined (block 1004). The characteristics of the phone call may include information related to the fields in call table 565. The call table 565 may be queried to determine the appropriate mode (block 1006). Device 202 or server 212 may compare the call characteristics to rules in call table 565 to determine the appropriate mode. For example, if ASSISTANT calls the user (e.g., ME), then the appropriate mode may be BUSINESS mode 620. If the user (e.g., ME) calls COLLEAGUE from HOME, then the appropriate mode may be PERSONAL mode 622. The user of device 202 may be prompted of the call (block 1008). The prompt may include the appropriate ring tone and skin identified in fields 610 and 612 in mode table 563 corresponding to the mode determined in block 1006. For example, if BUSINESS mode 620 is determined in block 1006 for an incoming call, then device 202 may ring softly and display a blue skin. If PERSONAL mode 622 is determined in block 1006 for an outgoing call, then device may display a green skin (but may not ring in one embodiment).

If the user does not accept the call (block 1010: NO), then process 1000 may end without changing an operating mode. If the user accepts the call (block 1010: YES), then process may continue to block 1012. In the case of an incoming call, accepting the call (block 1010: YES) may be considered "answering" the phone, while not accepting the call (block 1010: NO) may be considered not answering the phone. In the case of an outgoing call, accepting the call (block 1010: YES) may be considered a positive verification to place the call in the mode determined in block 1006, while not accepting the call (block 1010: NO) may be considered an indication not to place the call in the mode determined in block 1006.

If a mode is identified in block 1006 that is different than the current mode (block 1012: YES), then the mode may be changed (block 1014). For example, the mode may change from PERSONAL to BUSINESS or from BUSINESS to PERSONAL. If process 1000 is performed by server 212, then server 212 may send an instruction to device 202 to change modes. The placed phone call or received phone call may be enabled in the changed mode (block 1016).

When a user of device 202 places a phone call in BUSINESS mode 620, the phone call may be placed using 212-555-8000 (as indicated in mode table 563) and this phone number may be sent to the called phone in as a caller identification. When a user of device 202 places a phone call in PERSONAL mode 622, the call may be placed using phone number of 201-891-7329 (as indicated in mode table 563) and this phone number may be sent to the called phone as a caller identification. The called phone may use this information, e.g., the received phone number, to select an appropriate mode for its user. In one embodiment, device 202 may transmit a mode to the called phone and the called phone may select an appropriate mode for its user based on the mode selected by device 202.

After the placed phone call or received phone call, the mode may change back to the previous mode before the placed or received phone call (block 1018). For example, if block 1012 caused device 202 to change from BUSINESS mode 620 to PERSONAL mode 622, then the mode may change back to PERSONAL mode 622 from BUSINESS mode 620 after the phone call. If process 1000 is performed by server 212, then server 212 may send an instruction to device 202 to change modes. If process 1000 is performed by device 202, then device 202 may send an indication to server 212 of the change of mode.

In one embodiment, the mode does not change back to the previous mode before the placed or received phone call. In yet another embodiment, the user may be prompted to determine whether to change back to the previous mode or not. In another embodiment, the mode may be changed according to process 900 after the placed or received phone call. For example, state table and process 900 may determine, as a result of rule 788, that the BUSINESS mode 620 may be the preferred mode for the next ten minutes after a phone call from BOSS.

If a mode is identified by block 1006 that is the same as the current mode (block 1012: NO), then the mode may not change. The placed phone call or received phone call may be enabled in the current mode (block 1018). Process 1000 may be repeated when another call is place or received.

As discussed above, server 212 may track, manage, account for, itemize, and/or bill for activities in different modes. For example, if process 1000 determines that a phone call may be received in BUSINESS mode 620, the call may be accounted for and billed accordingly, e.g., billed to the user's work address. Likewise, if process 1000 determines that a phone call may be received in PERSONAL mode 622, and device 202 changes from BUSINESS mode 620 to PERSONAL mode 622, the call may be accounted for and billed accordingly, e.g., billed to the user's home address. In one embodiment, a single bill may account for multiple modes, such as PERSONAL mode 622 and BUSINESS mode 620, but may itemize and/or tally individual charges according to the appropriate mode.

In another embodiment, user device may provide a control key or a menu choice for a user to switch between different operating modes. For example, if in PERSONAL mode 622, a user may be able to switch to BUSINESS mode 620 by selecting a menu option. Alternatively, if in BUSINESS mode 620, a user may be able to switch to PERSONAL mode 622 by selecting a menu option. In one embodiment, such a menu option or button may be deactivated if it conflicts with a rule in state table 564 or call table 565. For example, a user may not be able to switch to BUSINESS mode 620 using such a button or menu selection when calling HOME from the OFFICE. In one embodiment, such a menu selection or button press may be an entry in state table 564.

In one embodiment, a user may select a call from a recent calls list and change the mode of a pervious call from one mode to another. If device 202 using process 1000, for example, selects the wrong mode for the call, the user may be able to change the mode of the call after the call. In this embodiment, billing errors may be corrected before a bill is sent.

Figure 11:
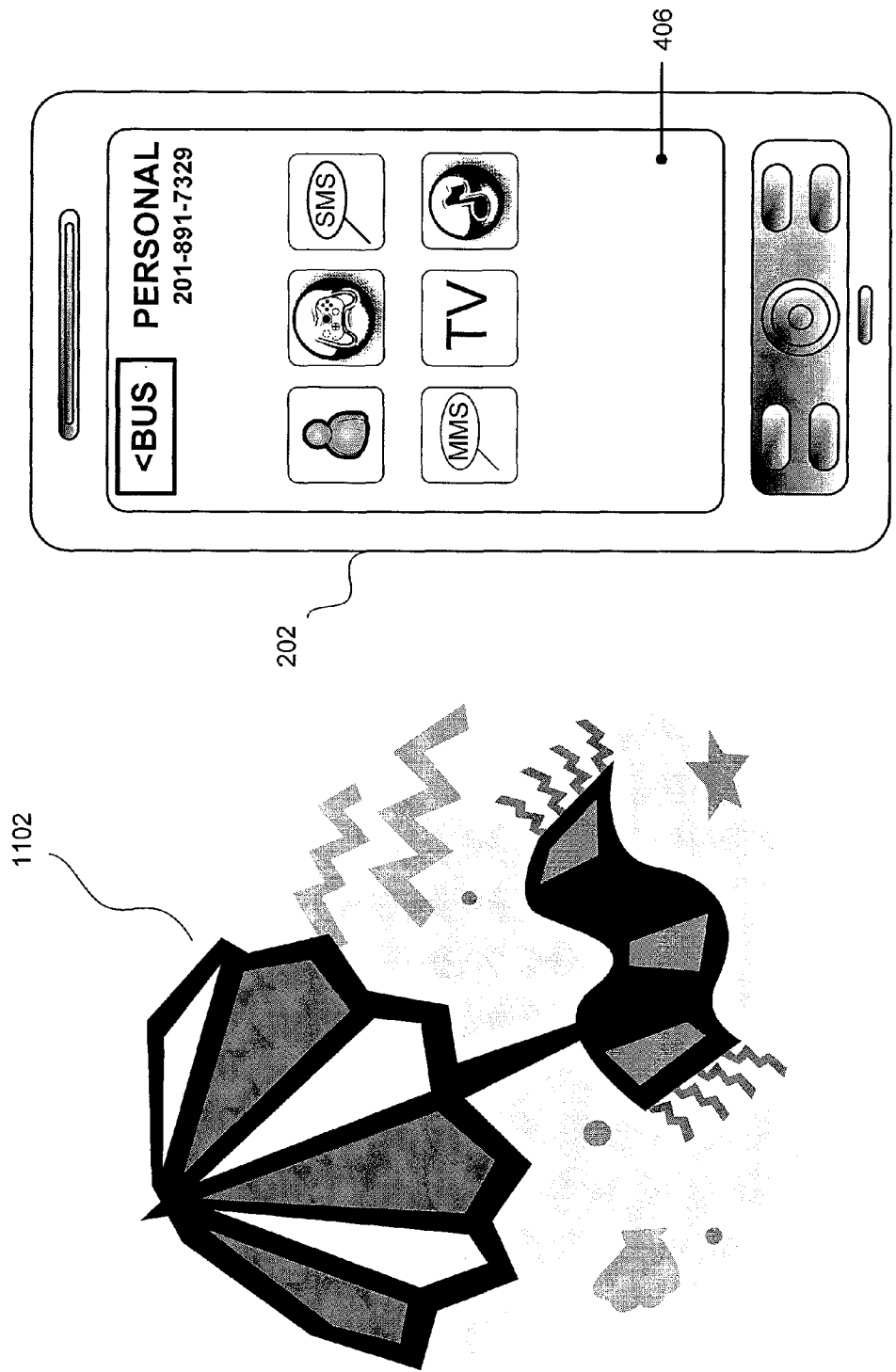
FIG. 11 is a diagram of a personal communications device in a personal mode.
Figure 12:
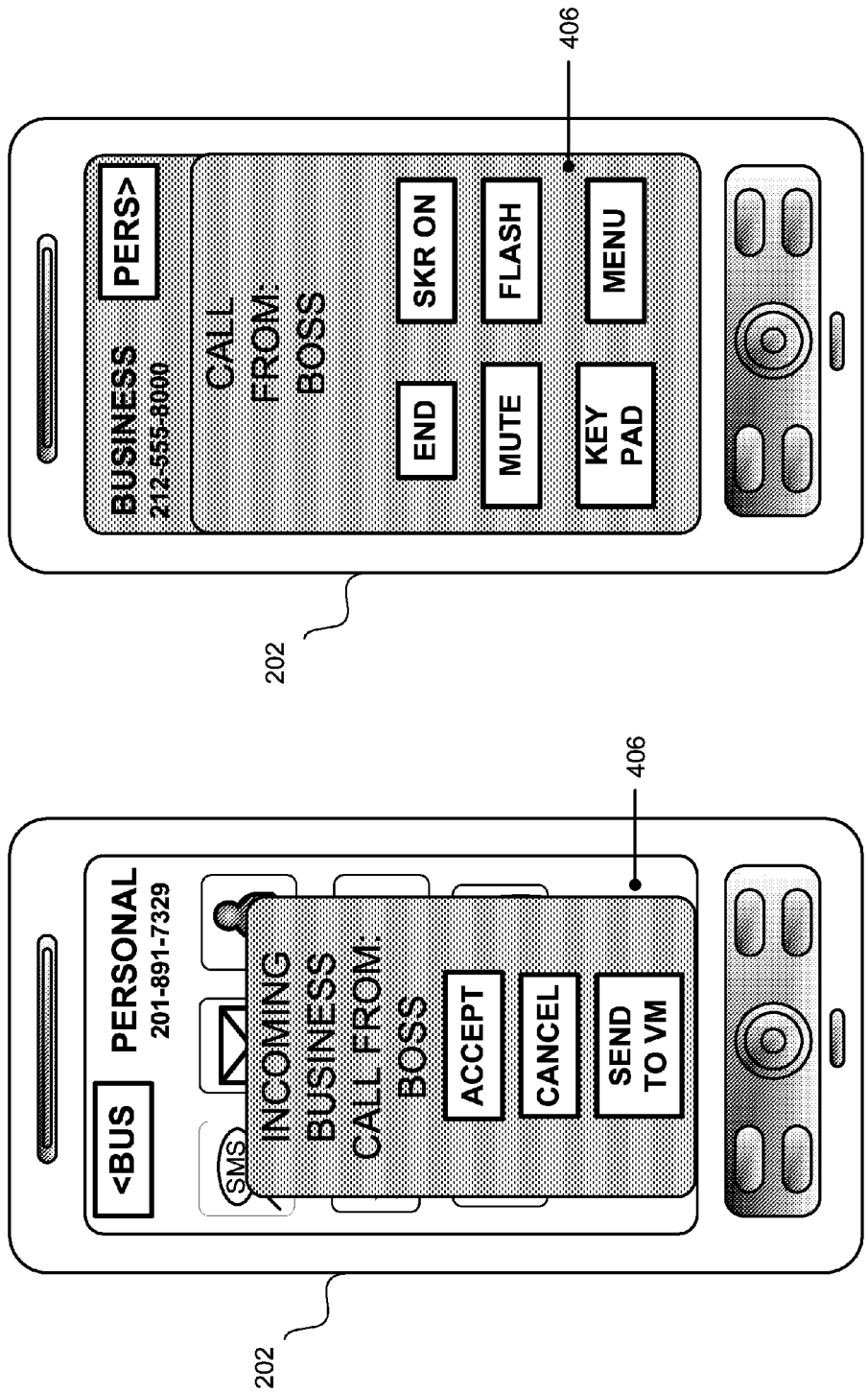
FIGS. 12A and 12B are diagrams of a personal communications device receiving a business call while in a private mode.
Figure 13:
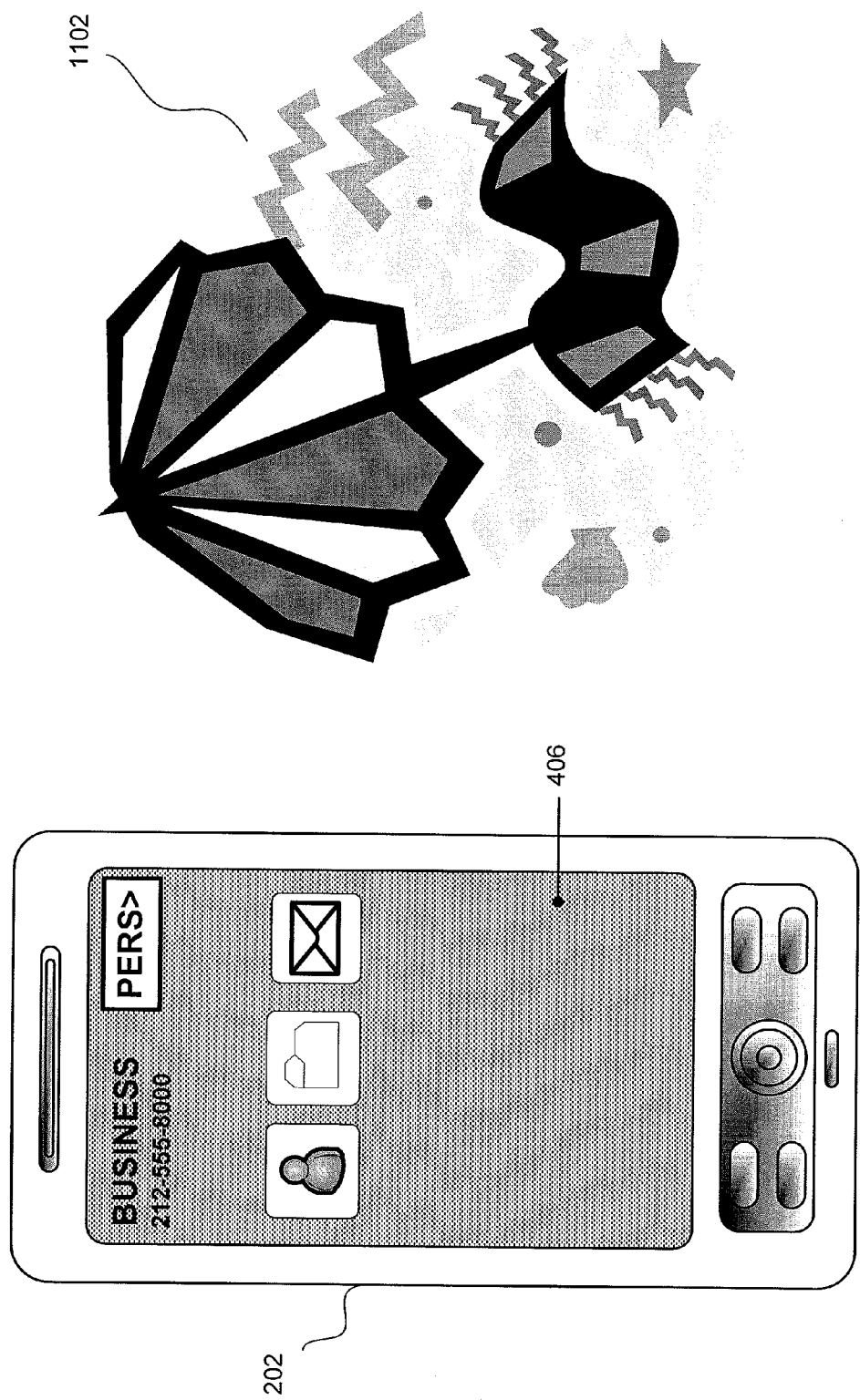
FIG. 13 is a diagram of a personal communications device in a business mode.

FIGS. 11, 12, and 13 are examples of processes 900 and 1000 in use in environment 200. FIG. 11 is a diagram of device 202 in PERSONAL mode 622. In the embodiment of FIG. 11, the user may have taken her device 202 on a holiday with her family at a beach 1102. Device 202 may execute process 900 to determine the state of device 202. Device 202 may determine that the day is a Saturday and that it is 500 km away from HOME. Device 202 may query state table 564 to apply a rule corresponding to the current state of device 202. Applying rule 792, for example, device 202 may determine that it may be in BUSINESS mode 620 because it is more than 200 km away from HOME. Applying rule 787, however, device 202 may determine that it may be in PERSONAL mode 622 because it is a Saturday. Looking to priority field 712, device 202 may ultimately choose PERSONAL mode 622 because rule 787 has a higher priority than rule 792. If device 202 is in BUSINESS mode 620, device 202 may switch to PERSONAL mode 622 as shown in FIG. 11. Device 202 may apply other rules (not shown in state table 564). For example, device 202 may look to a personal calendar, determine that its user is on vacation, and may choose PERSONAL mode 622. Device 202 may determine, using Bluetooth, that it is in the vicinity (e.g., within 10 meters) of the devices of its user's family members and may choose PERSONAL mode 622.

Applying the rules in mode table 563, device 202 displays the applications available to the user in PERSONAL mode 622. Consistent with mode table 563 the applications shown on display 406 include (from top left to bottom right): CONTACTS, TETRIS, SMS, MMS, TV REMOTE, and MUSIC. Further, consistent with mode table 563, the phone number for outgoing and incoming calls may be 201-891-7329 as shown in the upper-right corner of display 406. Also, consistent with mode table 563, in PERSONAL mode 622, the skin may be GREEN (shown as white in FIG. 11).

FIG. 12A is a diagram of device 202 receiving a call while in PERSONAL mode 622. While at beach 1102, device 202 may receive a phone call and may execute process 1000. Device 202 may determine the characteristics of the call. For example, the call may be from BOSS to ME (e.g., any of the phone numbers that may be associated with device 202). Device 202 may query call table 565. Applying rule 882, device 202 may determine that the call may place device 202 in BUSINESS mode 620. Device 202 may indicate on display 406 that there is an incoming business call from BOSS. In addition, consistent with mode table 563, device 202 may ring softly and may indicate the incoming phone call in a BLUE skin (shown as shaded in FIG. 12A). As shown in FIG. 12A, device 202 allows the user to accept or cancel the call or send the call to voicemail. If the user sends the call to voice mail, then any voice mail may be associated with data in BUSINESS mode 620. If the user accepts the call, device 202 may change to BUSINESS mode 620 as shown in FIG. 12B. Device 202 allows the user to end the call, among other options.

FIG. 13 is a diagram of device 202 in BUSINESS mode 620. If the user ends the call as shown in FIG. 12B, then device 202 may be in BUSINESS mode 620 as shown in FIG. 13. Device 202 may query mode table 563. Applying the rules in mode table 563, device displays the applications available to the user in BUSINESS mode 620. Consistent with mode table 563, the applications shown on display 406 may include (from left to right): CONTACTS, DOCS, and EMAIL. Further, consistent with mode table 563 the phone number for outgoing and incoming calls may be 212-555-8000 as shown in the upper-left corner of display 406. Also, consistent with mode table 563, the skin may be BLUE (shown as shaded in FIG. 13).

Device 202 may apply process 900 and determine the state of device 202. Device 202 may inspect the recently called list and discover that BOSS recently called. Device 202 may then query state table 564. Applying rule 790, device 202 may determine, for example, that it may be in BUSINESS mode 620 for the next 10 minutes. Because it is a Saturday, however, device 202 may also determine that it may be in PERSONAL mode 622. Looking to priority field 712, device 202 may ultimately determine to stay in BUSINESS mode 620 because rule 790 has a higher priority than rule 787.

The user of device 202, however, may not wish to stay in BUSINESS mode 620 because she is, after all, on holiday at beach 1102. The user may choose to select the personal mode button, labeled "PERS>" in the top-right corner of display 406 to switch to PERSONAL mode 622 as shown in FIG. 11.

As shown in FIG. 11, the user may select the music icon to launch a music application. In this application, the user may stream her favorite music from home entertainment system 214. Alternatively, the user may stream her favorite music from server 212. Alternatively, the user may select the TV icon to launch a TV remote control application. In this application, the user may stream her favorite video stored in her home entertainment system 214. Alternatively, the user may stream her favorite video from server 212. If the user were located at HOME rather than at beach 1102, device 202 may also function to change video channels, for example, in home entertainment center 214.

Server 212 may be tracking and accounting for device 202's use of network 210. The call from the BOSS may be charged to the user's business account associated with BUSINESS mode 620. The streaming of music from the user's home server may be charged to the user's personal account associated with PERSONAL mode 622.

In BUSINESS mode 620, the user may select a PBX application (not shown in FIG. 13). In a PBX application, device 202 may connect to a corporate PBX and the user may be able to call colleagues as though she were at her desk—without having to dial a country code, area code, or exchange, e.g., with only four numbers.

In one embodiment, a mode may require authentication of the user. For example, before entering BUSINESS mode 620, a user may be required to enter a personal identification number (PIN). In another embodiment, some applications in a mode may require authentication. For example, before accessing VPN application in BUSINESS mode 620, a user may be required to enter a password. A mode may also explicitly not require authentication. For example, PERSONAL mode 622 may not require any authentication. Device 202 may also authenticate a user using biometrics.

As indicated above, multiple phone numbers may be associated with device 202. In one embodiment, device 202 may include multiple electronic serial numbers (ESNs) where each ESN is associated with a different phone number. For example, device 202 may include multiple Subscriber Identity Module (SIM) cards. In another embodiment, device 202 may include a single ESN that is associated with multiple phone numbers. In yet another embodiment, device 202 may have multiple ESNs where each ESN is associated with one ore more phone numbers.

In one embodiment, mode table 563, state table 564, and call table 565 may be copied from device 202 to server 212. Tables stored in server 212 may act as backup tables. Mode table 563, state table 564, and call table 565 may also be copied from server 212 to device 202 or any other device. In this embodiment, tables may be transferred from one device, such as device 202, to another device, such as device 204.

Embodiments disclosed herein may provide for different modes of operation at different times for device 202. Embodiments disclosed herein may provide for device 202 to meet the different expectations of a user depending on the user's environment. Embodiments disclosed herein may allow for a separate billing of services under different modes of operation, such as separate billing for business services and personal services. Embodiments disclosed herein may also allow for the itemization or tallying of services under different modes of operation in a single bill.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above, such as in FIGS. 9 and 10, the order of the blocks may differ in other implementations. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
 determining a state of a portable communications device, wherein the state includes information about previous communications;
 comparing the state to a plurality of rules, wherein the plurality of rules include one or more conditions regarding previous communications, wherein each of the plurality of rules is associated with a corresponding one of a plurality of modes, and wherein each of the plurality of modes is associated with a corresponding one of at least two billing attributes; and
 changing a mode of the portable communications device, based on the comparison, to one of the plurality of modes,
  wherein the information about previous communications includes a first device identifier of a previous telephone call and a first email address of a previous email, and
  wherein the one or more conditions regarding previous communications includes a second device identifier, a second email address, and a time window.

2. The computer-implemented method of claim 1, wherein each of the at least two billing attributes is associated with a different device identifier, each device identifier identifying the portable communications device, and wherein changing the mode includes changing the device identifier.

3. The computer-implemented method of claim 2, wherein the at least two billing attributes include a personal billing account and a business billing account.

4. The computer-implemented method of claim 1, wherein each of the plurality of modes is associated with a different skin, wherein changing the mode includes changing the skin, and wherein changing the skin includes changing a background color or a background pattern of a display of the portable communications device.

5. The computer-implemented method of claim 1, wherein each of the plurality of modes is associated with a different set of applications and a different set of corresponding application data, and wherein changing the mode includes changing the set of applications and the set of corresponding application data.

6. The computer-implemented method of claim 5, wherein each of the plurality of modes is associated with a different contact list.

7. The computer-implemented method of claim 1, wherein the state includes a current time of day or a current day of week, and wherein comparing the state includes comparing the current time of day or the current day of week.

8. The computer-implemented method of claim 1, wherein the state includes a current location and wherein comparing the state includes comparing the current location.

9. The computer-implemented method of claim 1, wherein the state includes a device identifier of a called device of an outgoing phone call from the portable communication device.

10. A system comprising:
a portable communications device including:
a transceiver to transmit and receive user communications;
a memory to store a plurality of rules, each of the plurality of rules associated with one of a plurality of modes, wherein each of the plurality of modes is associated with one of at least two billing attributes; and
a processor to determine a state of the portable communications device based on words used in the user communications, compare the state to each of the plurality of rules, and change a mode of the portable communications device, based on the comparison and based on a location of a called party, to one of the plurality of modes associated with one of the plurality of rules,
wherein the words used in the user communications include words spoken in a phone call by the user of the portable communications device.

11. The system of claim 10, wherein each of the at least two billing attributes is associated with a different device identifier, each device identifier identifying the portable communications device.

12. The system of claim 10, wherein each of the plurality of modes is associated with a different skin, wherein the processor is configured to select the skin based on the comparison, and wherein the portable communications device further comprises:
a display for displaying a background simultaneously with a plurality of icons associated with applications, wherein the processor instructs the display to change, based on the selected skin, a background color or a background pattern.

13. The system of claim 10, wherein each of the plurality of modes is associated with a different set of applications and a different set of corresponding application data, and wherein the processor changes the set of applications and corresponding application data based on the comparison.

14. The system of claim 13, wherein each of the plurality of modes is associated with a different contact list.

15. The system of claim 10, wherein the state includes a current time of day or a current day of week, and wherein the processor compares the current time of day or the current day of week.

16. The system of claim 10, wherein the state includes a current location and wherein the processor compares the current location.

17. The system of claim 10, wherein the state includes a device identifier of a called device of an outgoing phone call and the processor compares the device identifier of the called device of the outgoing phone call.

18. A computer-implemented method comprising:
determining a state of a portable communications device based on words transmitted or received in user communications including words spoken in a phone call by a user of the portable communications device;
comparing the state to a plurality of rules, each of the plurality of rules associated with one of a plurality of modes, wherein each of the plurality of modes is associated with one of at least two billing attributes, each device identifier identifying the portable communications device;
selecting, based on the comparison and based on a location of a called party, a mode from the plurality of modes; and
changing a mode of the portable communications device to the selected mode.

19. The computer-implemented method of claim 18, wherein each of the at least two billing attributes is associated with a different device identifier, and wherein changing the mode includes changing the device identifier.

20. The computer-implemented method of claim 19, wherein the at least two billing attributes include a personal billing account and a business billing account.

21. The computer-implemented method of claim 1, wherein the time window is a first time window associated with the second device identifier, and wherein the one or more conditions regarding previous communications includes a second time window associated with the second email address.

22. The system of claim 10, wherein the words used in the user communications includes words appearing in an email sent from or received by the portable communications device.

23. The system of claim 12, wherein the processor instructs the display to change, based on the selected skin, a window border size, a button size, or a text size.

24. The method of claim 1, wherein the time window ends at a present time and begins at a predetermined time period before the present time.

25. The method of claim 18, further comprising selecting a mode based on a priority associated with each rule when the comparison results in a conflict between the plurality of rules.

* * * * *